(12) United States Patent
Kim et al.

(10) Patent No.: US 8,686,213 B2
(45) Date of Patent: Apr. 1, 2014

(54) DISPOSAL AND DECONTAMINATION OF RADIOACTIVE POLYVINYL ALCOHOL PRODUCTS

(75) Inventors: Jin-Kil Kim, Seoul (KR); Eui-Dong Lee, Seoul (KR); Hyun-Ki Kim, Ulsan (KR); Seong-Jun Hong, Kangwon-Do (KR)

(73) Assignee: Hana Inspection & Engineering Co., Ltd. (KR)

( * ) Notice: Subject to any disclaimer, the term of this patent is extended or adjusted under 35 U.S.C. 154(b) by 120 days.

(21) Appl. No.: 13/508,895

(22) PCT Filed: Nov. 12, 2010

(86) PCT No.: PCT/IB2010/003042
§ 371 (c)(1),
(2), (4) Date: May 11, 2012

(87) PCT Pub. No.: WO2011/061621
PCT Pub. Date: May 26, 2011

(65) Prior Publication Data
US 2012/0220809 A1    Aug. 30, 2012

(30) Foreign Application Priority Data

Nov. 17, 2009  (KR) ........................ 10-2009-0111039
Mar. 5, 2010   (KR) ........................ 10-2020-0020017

(51) Int. Cl.
*G21F 9/14*    (2006.01)

(52) U.S. Cl.
USPC ........ 588/19; 588/405; 423/245.1; 423/245.3

(58) Field of Classification Search
USPC ................. 588/19, 18, 405; 423/245.1, 245.3
See application file for complete search history.

(56) References Cited

U.S. PATENT DOCUMENTS

| 3,859,269 | A | 1/1975 | Maurer |
| 5,110,481 | A | 5/1992 | Sando et al. |
| 5,181,967 | A | 1/1993 | Honeycutt |
| 5,241,045 | A | 8/1993 | Matz |
| 6,184,340 | B1 | 2/2001 | Smith et al. |
| 7,147,787 | B2 | 12/2006 | Chisholm et al. |
| 2005/0050608 | A1 | 3/2005 | Jones et al. |

FOREIGN PATENT DOCUMENTS

| JP | 51146759 | 12/1976 |
| JP | 55035956 | 3/1980 |
| JP | 60044897 | 3/1985 |
| JP | 11019664 | 1/1999 |
| JP | 11172039 | 6/1999 |
| KR | 20080034260 | 4/2008 |

OTHER PUBLICATIONS

Smith, R.J. et al., "Utilization of Water Soluble Plastics for Radiological Control within Nuclear Power Plants", Waste Management Symposium, 1989, pp. 465-470.
"Emerging LLW Technologies: Dissolvable Clothing", EPRI, Palo Alto, CA, and TXU-Comanche Peak, Glen Rose, TX: 2002. 1003435, pp. 1-89.
International Search Report in PCT/IB2010/003042, mailed Mar. 25, 2011.

*Primary Examiner* — Edward Johnson
(74) *Attorney, Agent, or Firm* — Withers & Keys, LLC

(57) ABSTRACT

Methods and apparatus for decontaminating disposable protective products prepared from polyvinyl alcohol (PVA), used in a nuclear power plant, to less than minimum detectable activity (MDA) are disclosed. In the disclosed methods and apparatus, solid protective products made of PVA, generated from a nuclear power plant, are dissolved into a liquid, and then are decontaminated to less than MDA. The PVA solution decontaminated in this way is concentrated to an appropriate concentration or dried, and finally is subjected to self-disposal. This can fundamentally block the generation amount of combustible waste amounting to 50% or more of low and intermediate level waste of nuclear power plants, thereby considerably contributing to a reduction of the operating expenses of the nuclear power plants. The present invention further relates to methods and apparatus for self-disposing disposable protective products manufactured by conventional polyvinyl alcohol (PVA) through pyrolysis/catalytic oxidation of a PVA solution generated by concentration, and treating the decontaminated PVA solution within a plant. The PVA protective products are dissolved/concentrated/oxidized in water to remove firstly organic matter, and then PVA materials in the PVA solution are completely oxidized into $CO_2$ and $H_2O$ by using a small-sized pyrolysis/catalytic oxidation reactor.

20 Claims, 8 Drawing Sheets

DISPOSAL AND DECONTAMINATION OF RADIOACTIVE POLYVINYL ALCOHOL PRODUCTS

This application is being filed as a PCT International Patent Application claiming priority to (i) Korean Patent Application Serial No. 10-2009-0111039 filed on 17 Nov. 2009 and entitled "DISPOSITION METHOD AND ITS PROCESS FOR PROTECTIVE PRODUCTS MANUFACTURED BY POLYVINYL ALCOHOL" and (ii) Korean Patent Application Serial No. 10-2010-0020017 filed on 5 Mar. 2010 and entitled "TREATMENT METHOD AND ITS PROCESS FOR PROTECTIVE PRODUCT MANUFACTURED BY POLYVINYL ALCOHOL."

FIELD OF THE INVENTION

The present invention is related generally to methods and apparatus for disposal of contaminated disposable products formed from polyvinyl alcohol (PVA), especially methods and apparatus for use in the nuclear industry.

BACKGROUND OF THE INVENTION

In a state where the storage spaces of domestic nuclear power plants' keeping radioactive waste are saturated, as the prearranged date of operation of a Kyung-ju low and intermediate level radioactive waste repository has been delayed for about 2 years from the end of 2009, the development on a technology of reducing an amount of the waste generated from the nuclear power plants has risen as a very interesting present issue. Since the reported cost for permanent disposal of waste generated by the operation of a nuclear power plant exceeds about 7,400,000 won per drum, it is determined that a payment for the cost for disposal of the waste may be a considerable burden on a nuclear power plant proprietor.

Table 1 shows an examination on a trend in the recent generation of waste from domestic nuclear power plants. As a result of an analysis on the waste generated from nuclear power plants from 2006 to 2008, it was found that the percentage of miscellaneous radioactive solid waste is about 83% of the whole waste, and the percentage of combustible waste is about 55.8% of the miscellaneous radioactive solid waste. Accordingly, it is required to suggest a fundamental alternative plan for reducing the percentage of the combustible waste in the miscellaneous radioactive solid waste.

It has been examined that in a case of nuclear power plants of USA and Mexico, 85% or more of the plants participate in reducing the operating expenses of a washing room and the amount of generated waste through the use of various water-soluble protective products prepared from PVA, such as working clothes, decontamination paper, overshoes, a leakage rod, or the like. According to an EPRI report, it has been reported that the reduction ratio of waste by the use of the PVA protective products is 10,000:1.

The technology for reducing the amount of combustible waste generated from a nuclear power plant may be divided into a technology for blocking generating sources and a technology for treating generated waste. In general, it can be said that a technology capable of most effectively treating combustible waste is an incineration technology. However, in view of the present domestic affairs, there is a difficulty in that the incinerating and final-disposing of the radioactive waste within the plant are not agreeable techniques according to people's feeling, and also are contradictory to the environmentally friendly operation of a nuclear power plant proprietor. Moreover, if the management is insufficient, volatile radioactive materials may be recklessly discharged to the environment, thereby causing chronic environmental pollution. Accordingly, a solution for significantly reducing the generation amount of radioactive waste is to fundamentally block the generation of combustible waste. However, in view of the inevitability of the generation of combustible waste during the operation of a nuclear power plant, it is required to prepare a fundamental solution for reducing the generation amount of waste.

From this point of view, the introduction of protective products prepared from PVA can be a solution of the problem. PVA has a physiochemical characteristic similar to cotton unlike other polymer materials. It also has an advantage in that it is dissolved in water of 100° C. This allows radioactive materials of the waste of products prepared from PVA to be easily decontaminated below MDA, and to be biochemically treated, and allows the treated waste to be finally decomposed into $CO_2$ and $H_2O$. Thus, it can be said that the products are very environmentally friendly products.

In a case of domestic nuclear power plants, since the first test application of the use of PVA protective products in 2007, the usage amount tends to be gradually increased. Also, the kinds of the products used in the nuclear power plants are variously changed, from working clothes at the initial stage, to decontamination paper, vinyl, overshoes, gloves, a leakage absorbing rod, or the like.

U.S. Pat. No. 7,147,787 and Korea Patent No. 2002-0063896 disclose an apparatus and a method for completely dissolving, and sterilizing clothes, supplies, devices, and other products, prepared from PVA, and removing radioactive materials from the products, which decomposes PVA into organic acid and finally treats the decomposed PVA in a foul water drain system. In the method disclosed in the patents, a PVA material is dissolved in 0.5~5 w/v %, decomposed into organic acid by using a —OH radical, and treated by using a general domestic sewage treatment stream. The method disclosed in the patents is very advantageous in terms of volume reduction and treatment expenses of radioactive waste. How-

TABLE 1

| | | 2006 | | 2007 | | 2008 | | |
|---|---|---|---|---|---|---|---|---|
| index | | generation | ratio (%) | generation | ratio (%) | generation | ratio (%) | total ratio (%) |
| waste resin | | 343 | 6.2 | 317 | 5.4 | 196 | 4.2 | 856 (5.4) |
| waste filter | | 19 | 0.3 | 13 | 0.2 | 10 | 0.2 | 42 (0.2) |
| miscellaneous solid | combustible | 3083 | 56 | 3464 | 58.9 | 2435 | 51.6 | 8982 (55.8) |
| | incombustible | 2063 | 37.5 | 2084 | 35.5 | 2074 | 44 | 6221 (38.6) |
| total (drum) | | 5508 | 100 | 5878 | 100 | 4715 | 100 | 16101 (100) |

* Reference document: Nuclear Power Plant White Paper 2006 to 2008 ever, in a case of a domestic nuclear power industry, the taking out of radioactive waste is strictly limited, and the treatment method of the waste is also limited to incineration, which in actuality does not allow the waste to be entrusted to an operator operating a biological treatment facility. Accordingly, it is immediately required to develop an efficient PVA protective product treatment technology in accordance with domestic affairs.

Issued Korean Patent No. 10-0823961 discloses a method for treating PVA protective products, in which a plasma incinerator is used to high-temperature-incinerate them. The treatment method of the patent includes technical features required to be additionally complemented in that the incineration of the PVA solution in a high-temperature condition of 1000° C. or more generates a large amount of nitrogen oxide, the use of auxiliary fuel for two-stage combustion increases operating expenses, and the combustion of a liquid containing high-concentration PVA materials in the use of a plasma generator may generate soot due to an un-burned reaction.

In order to reduce an operation cost of a nuclear power plant, and to give an environmentally friendly image to the nuclear power industry through the introduction of PVA protective products capable of significantly reducing the amount of waste generated from domestic nuclear power plants, it is desired to develop a treatment method which can sufficiently utilize environmentally friendly characteristics of PVA protective products.

SUMMARY OF THE INVENTION

Therefore, the present invention has been made in view of the above-mentioned problems of domestic nuclear power plants, and an object of the present invention is to provide a technology for treating protective products prepared from a PVA resin in order to increase the use of the PVA productive products. The PVA productive products are introduced to significantly reduce the amount of combustible waste amounting to 50% or more of waste generated from domestic nuclear power plants.

Another object of the present invention is to provide a method and an apparatus for decontaminating PVA waste generated in a nuclear power plant, the method and apparatus being environmentally friendly disposal technology for final self-disposal.

A further object of the present invention is to provide an apparatus for treating radioactive waste, in which the size of the apparatus can be smaller than that of a conventional system for treating water-soluble radioactive waste, and the area occupied by the facility can be reduced.

A further object of the present invention is to provide a method and an apparatus for self-disposing disposable protective products prepared from conventional polyvinyl alcohol (PVA) through pyrolysis/catalytic oxidation of a PVA solution generated by concentration, and treating the decontaminated PVA solution within a plant.

Another object of the present invention is to provide a method and an apparatus for treating PVA protective products, in which the PVA protective products are dissolved/concentrated/oxidized in water to remove firstly organic matter, and then a small-sized pyrolysis/catalytic oxidation reactor is used to oxidize PVA materials existing in a PVA solution into $CO_2$ and $H_2O$ completely.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

Figure 1:
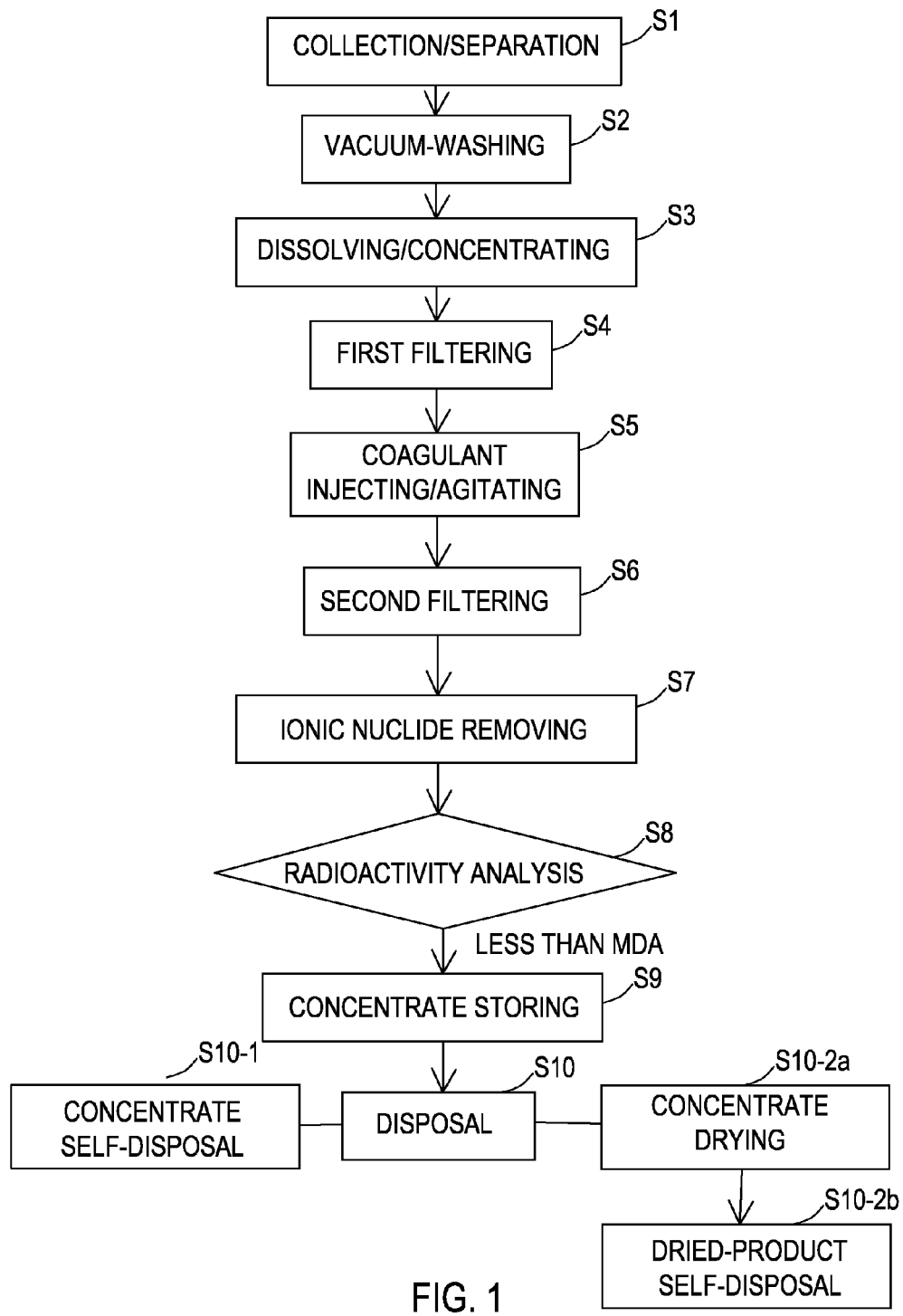
FIG. 1 is a block diagram illustrating an exemplary method for decontaminating a protective product prepared from polyvinyl alcohol according to the present invention.

The present invention relates to a method for self-disposing protective products prepared from polyvinyl alcohol (PVA) (hereinafter, referred to as "PVA protective products"), used in a nuclear power plant, through decontamination of less than MDA. This is a technology for reducing low and intermediate level waste, which can maximize the economical efficiency and the environmentally friendly advantages in such a manner that it can overcome disadvantages in view of a cost of a conventional technology for permanently disposing waste through drum treatment, and also can overcome disadvantages of an incinerating technology, contradictory to the environmentally friendly operation of a nuclear power plant. More particularly, the present invention relates to a method for treating protective products by dissolving and concentrating low and intermediate level radioactive waste made of PVA (recently generated from a nuclear power plant) in water, decontaminating the radioactive materials to less than MDA through a coagulation and filter system, and finally self-disposing a concentrated PVA solution through concentration or drying.

The present invention further relates to methods and apparatus for treating disposable protective products prepared from polyvinyl alcohol (PVA), used in a nuclear power plant. More particularly, the present invention relates to methods and apparatus for treating PVA protective products, which can completely oxidize a PVA solution generated by dissolution/concentration of the PVA protective products into $CO_2$ and $H_2O$ by using a pyrolysis/catalytic oxidation and treat the oxidized materials within the plant.

In one embodiment of the present invention, there is provided a method for decontaminating a protective product prepared from polyvinyl alcohol (PVA), the method including: a collecting/separating step of used PVA protective products; a first washing step for pre-treating the PVA protective products through ultrasonic washing under a vacuum condition; a PVA dissolving/concentrating step for secondly washing the protective products vacuum-washed in the first washing step; a first filtering step for filtering radioactive materials in a dissolved/concentrated aqueous solution by using a filter; a coagulant supplying step for treating the radioactive materials in untreated filtrate from the first filtering step, and a second filtering step; an ion adsorbing step for removing the radioactive materials in untreated filtrate from the second filtering step; a radioactivity analyzing step of a PVA solution whose radioactive materials are removed, and a concentrate storing step; and a disposal step for treating a concentrated non-radioactive PVA solution.

In the first washing step, nuclides attached to or absorbed in a water-soluble protective product are preferably removed. The nuclides are preferably H-3 and C-14. In order to increase an efficiency of washing radioactive materials attached or absorbed in the water-soluble protective product, inside of a multi-reactor is preferably maintained in a vacuum atmosphere of 100 to 300 Torr. The water-soluble protective product is preferably washed by a piezoelectric type of ultrasonic wave generator under a vacuum atmosphere.

In the multi-reactor, a filtrate circulating line is preferably positioned in a tangential direction of an outer circumferential surface so that the filtrate is spirally supplied to the tangential direction.

The multi-reactor is preferably connected to a heater tank for heating the inside of the multi-reactor in the PVA dissolving/concentrating step. Preferably, the heater tank heats the multi-reactor so that PVA of the water-soluble protective product is firstly dissolved in a solution to be contained in an amount of 5 to 15 wt % of the PVA. The solution including PVA dissolved therein is preferably concentrated to 35 to 45 wt % so as to minimize a generation amount of liquid-state waste to be self-disposed.

The heater tank allows purified water whose ionic particles are removed to indirectly heat the multi-reactor via a heating jacket. The purified water contained in the heater tank is preferably formed into vapor of 100~130° C. by a heater.

In the multi-reactor, during first dissolution of PVA, preferably, hydrogen peroxide and iron salt are introduced to cause a Fenton reaction, typically, when 70 to 95% of a PVA material is dissolved. Hydroxyl radicals generated from the Fenton reaction facilitate dissolution of PVA. Preferably, the hydrogen peroxide (purity 35 wt %) is introduced in an amount of 0.3 to 1 $L_{H2O2}/kg_{PVAprotective-clothes}$, and the iron salt solution is introduced in an amount of 0.1 to 0.5 $L_{iron-salt-solution}/kg_{PVAprotective-clothes}$. The iron salt solution is preferably formed by introducing 6.25 mL of $H_2SO_4$ (purity: 35%) and 2.18 g of $FeSO_4 7H_2O$ in a 500 mL volumetric flask, and filling distilled water up to 500 mL of the volumetric flask, followed by a purifying process for one hour.

Preferably, the solution comprising dissolved PVA is heated and pressurized in a temperature ranging from 80 to 85° C. and a pressure ranging from 100 to 300 Torr, so that moisture of the solution is evaporated and the evaporated moisture is condensed and recycled as process water.

In the first filtering step, a filter with a diameter of 1 to 80 μm is preferably used to firstly remove radioactive nuclides contained in the concentrate.

A coagulant is preferably introduced through a coagulant injecting and agitating step so as to remove gamma nuclides in waste water, wherein both acrylamide-based cationic/anionic polymer coagulants are used under a condition of pH 6.5 to 7.0, and a supply amount of the coagulants is within a range of 0.2~1.0 $mL_{polymer}/L_{PVAsolution}$.

A coagulating seed containing iron salt is preferably introduced in a ratio of 0.2~1.0 $mL_{coagulating-seed}/L_{PVAsolution}$ before injection of the coagulant to increase the decontamination efficiency, in such a manner that the injected coagulant allows a stable floc to be generated in a PVA solution containing a high-concentration organic matter.

In the first filtering step and the second filtering step, a filter with a diameter of 0.2 to 80 μm is preferably used to filter a coagulant in the concentrate. In the ion adsorbing step, an ion exchange medium used for removing ionic nuclides is preferably metal oxide form. In some embodiments of the present invention, the disposal step for treating the PVA solution is preferably carried out by any one of a concentrate self-disposal process or a concentrate dried-product incineration disposal process.

Referring to FIGS. 1 to 6, one exemplary process according to the present invention comprises: 1) a collecting/separating step (S1) of used PVA protective products; 2) a first washing step (S2) for pre-treating the PVA protective products through ultrasonic washing under a vacuum condition; 3) a PVA dissolving/concentrating step (S3) for decontaminating/disposing the protective products vacuum-washed by the first washing step; 4) a first filtering step (S4) for filtering radioactive materials in the dissolved/concentrated aqueous solution by using a filter; 5) a coagulant supplying step (S5) for treating untreated radioactive materials in the first filtering, and a second filtering step (S6); 6) an ion adsorbing step (S7) for removing untreated radioactive materials from the filtrate after the second filtering; 7) a radioactivity analyzing step (S8) of a PVA solution whose radioactive materials are removed, and a concentrate storing step (S9); and 8) a disposal step (S10) for treating the concentrated non-radioactive PVA solution.

In the collecting/separating step (S1) for collecting protective products from the field and separating insoluble materials, PVA protective products used in a nuclear power plant are collected and stored in a certain district. The collected protective products are divided into predetermined volume units, each of which can be treated by a multi-reactor (100) at once. Herein, through visual inspection, some protective products which are contaminated by oil, particulates, and the like are classified as higher-contaminated protective clothes, and other protective products which are not contaminated by the above mentioned contaminants are classified as lower-contaminated protective clothes. The decontamination of the protective products is performed from the lower-contaminated protective clothes to higher-contaminated protective clothes step by step.

Table 2 below is on the analysis of the status of contaminants generated from a nuclear power plant, according to the kind of PVA protective products. As shown in Table 2, contamination levels of working clothes worn and overshoes worn on shoes in a radioactive contamination area show of 1.75E+02 Bq/g and 1.52E+03 Bq/g, respectively. From the analysis, it can be seen that the level of the former is about 10 times higher than that of the latter.

Accordingly, by treating higher-contaminated protective clothes after the completion of the decontamination of lower-contaminated protective clothes, it is possible to minimize the contamination to the apparatus by the radioactive materials, and to obtain a better decontamination effect. The PVA protective protects separated from this process are put in the multi-reactor (100).

TABLE 2

| gamma nuclide | protective clothes | overshoes |
|---|---|---|
| Na-22 | | 4.08E−01 |
| SC-47 | | 3.22E−01 |
| Cr-51 | | 4.29E+00 |
| Mn-54 | 6.94E+00 | 4.19E+01 |
| Fe-59 | 2.61E+00 | 1.21E+01 |
| Co-60 | 2.82E+01 | 2.54E+02 |
| NB-94 | 1.01E+00 | 9.46E+00 |
| Nb-95 | 8.71E+01 | 7.56E+02 |
| Zr-95 | 4.12E+01 | 3.58E+02 |
| Ru-103 | 4.65E−01 | 4.03E+00 |
| Ag-110m | 6.38E−01 | 5.52E+00 |
| Sn-113 | 7.55E−01 | 7.64E+00 |
| Sb-124 | 1.30E+00 | 1.25E+01 |
| Sb-125 | 2.25E+00 | 2.05E+01 |
| Ba-131 | | 1.23E+00 |
| Cs-134 | | 1.25E+00 |
| Cs-137 | 2.03E+00 | 1.50E+01 |
| Ce-141 | | 3.12E−01 |
| Ce-144 | 7.28E−01 | 5.78E+00 |
| Hf-181 | | 2.00E+00 |
| Os-185 | | 1.51E+00 |
| Re-186 | | 1.91E+00 |
| Au-199 | | 5.93E−01 |
| Am-241 | | 8.74E−01 |
| Total radioactivity (Bq/g) | 1.75E+02 | 1.52E+03 |

In the vacuum washing step (S2) for pre-treating the radioactive materials stuck to the PVA protective products through ultrasonic washing under a vacuum condition, the PVA protective products contaminated with the radioactive materials are firstly washed under a vacuum condition by using ultrasonic waves. Thus, H-3, C-14 and other gamma nuclides as well as the particulates are firstly removed. This minimizes the radioactive materials existing in a solution when the protective products are dissolved, thereby increasing the decontamination efficiency. In order to wash the PVA protective products put in the multi-reactor (100), tap water is supplied via a water supply line (L14). Once a predetermined amount of water is supplied to the multi-reactor (100), a water supply valve is locked by a signal of a water level gauge (100a), and a vacuum pump (50) is operated, in such a manner that the internal pressure of the multi-reactor is maintained in a range of 100 to 300 Torr. In the step 2), in order to improve the washing efficiency of the PVA protective products, an ultrasonic vacuum impregnation washing is applied to the lateral surface of the multi-reactor (100).

In step 2), since the protective products are washed under a vacuum condition, the efficiency for removing the contaminants can be increased. Liquid is circulated via a solution circulating line (L3) by the operation of a mixing pump (30), it is possible to facilitate the removal of particulate radioactive materials stuck to the protective products. It is possible to expect higher washing efficiency by applying ultrasonic waves to to-be-washed materials by using an ultrasonic wave generator (102). More specifically, a piezoelectric type of ultrasonic transducer is appropriate, the washing efficiency can be increased by providing the ultrasonic transducer in the lateral surface of the multi-reactor (100), 0.5 to 1 hour per washing time is appropriate, and the appropriate number of washing times is 3 to 5 times/batch. A compressing means (7) provided at the upper portion of the multi-reactor (100) can dehydrate the protective protects after the discharge of the washing liquid, thereby increasing the decontamination efficiency.

The removing efficiency of gamma nuclides treated in the step 2) is shown to Table 3. As shown in Table 3, in a case of the protective clothes, the nuclide removing efficiency was about 77.6%, from 1.75E+02 Bq/g at the initial stage to 3.93E+01 Bq/g after the washing, while in a case of the overshoes, the nuclide removing efficiency was about 65.3% from 1.52E+03 Bq/g to 5.27E+02 Bq/g.

The washing liquid generated from the washing process can be discharged linked with a nuclear power plant LRS system without additional treatment, thereby reducing the burden on the treatment of generated waste liquid.

TABLE 3

| | protective clothes | | | overshoes | | |
|---|---|---|---|---|---|---|
| gamma nuclide | initial stage | after washing | decon. eff. | initial stage | after washing | decon. eff. |
| Na-22 | | | | 4.08E−01 | 9.26E−02 | 77.3 |
| SC-47 | | | | 3.22E−01 | less than MDA | 99.9999 |
| Cr-51 | | | | 4.29E+00 | 1.61E+00 | 62.47 |
| Mn-54 | 6.94E+00 | 1.51E+00 | 78.3 | 4.19E+01 | 1.16E+01 | 72.32 |
| Fe-59 | 2.61E+00 | 6.04E−01 | 76.87 | 1.21E+01 | 3.22E+00 | 73.39 |
| Co-60 | 2.82E+01 | 6.41E+00 | 77.31 | 2.54E+02 | 7.81E+01 | 69.25 |
| NB-94 | 1.01E+00 | 2.08E−01 | 79.37 | 9.46E+00 | 2.78E+00 | 70.61 |
| Nb-95 | 8.71E+01 | 1.96E+01 | 77.55 | 7.56E+02 | 2.80E+02 | 62.96 |
| Zr-95 | 4.12E+01 | 9.19E+00 | 77.68 | 3.58E+02 | 1.28E+02 | 64.25 |
| Ru-103 | 4.65E−01 | 1.12E−01 | 75.97 | 4.03E+00 | 1.73E+00 | 57.07 |
| Ag-110m | 6.38E−01 | 1.15E−01 | 82.04 | 5.52E+00 | 1.91E+00 | 65.4 |
| Sn-113 | 7.55E−01 | 1.59E−01 | 78.99 | 7.64E+00 | 2.39E+00 | 68.72 |
| Sb-124 | 1.30E+00 | 2.78E−01 | 78.61 | 1.25E+01 | 4.10E+00 | 67.2 |
| Sb-125 | 2.25E+00 | 5.20E−01 | 76.82 | 2.05E+01 | 6.12E+00 | 70.15 |
| Ba-131 | | | | 1.23E+00 | less than MDA | 99.9999 |
| Cs-134 | | | | 1.25E+00 | less than MDA | 99.9999 |
| Cs-137 | 2.03E+00 | 3.88E−01 | 80.94 | 1.50E+01 | 2.78E+00 | 81.47 |
| Ce-141 | | | | 3.12E−01 | less than MDA | 99.9999 |
| Ce-144 | 7.28E−01 | 2.94E−01 | 59.67 | 5.78E+00 | 1.96E+00 | 66.09 |
| Hf-181 | | | | 2.00E+00 | 5.01E−01 | 74.95 |
| Os-185 | | | | 1.51E+00 | less than MDA | 99.9999 |
| Re-186 | | | | 1.91E+00 | less than MDA | 99.9999 |
| Au-199 | | | | 5.93E−01 | less than MDA | 99.9999 |

TABLE 3-continued

| | protective clothes | | | overshoes | | |
|---|---|---|---|---|---|---|
| gamma nuclide | initial stage | after washing | decon. eff. | initial stage | after washing | decon. eff. |
| Am-241 | | | | 8.74E−01 | less than MDA | 99.9999 |
| Total activity (Bq/g) & Average treatment Effic.(%) | 1.75E+02 | 3.93E+01 | 77.6 | 1.52E+03 | 5.27E+02 | 65.3 |

In step (S3) for dissolving/concentrating the protective protects after the washing, the PVA protective products, which have been firstly decontaminated through the step 2), dissolving and concentrating processes are sequentially performed for effective second decontamination. A PVA material has a characteristic in that it is dissolved in water of 100° C. Such a characteristic may be used for preparing a PVA solution with a predetermined concentration.

After the washing process (S2), a predetermined amount of water required for dissolution is supplied to the multi-reactor (100) via the water supply line (L14), and then, steam generated from a heater tank (300) is used to indirectly heat the multi-reactor (100). Especially, a heating unit for heating the multi-reactor (100) generates steam of 100 to 130° C. by firstly heating the water stored in the heater tank (300) through a heater (301), and herein, the generated high-temperature vapor is supplied to a heating jacket (105) provided at the bottom of the multi-reactor (100), via a vapor supply line (L12), thereby indirectly heating the inside of the multi-reactor. When the internal temperature of the multi-reactor is 95° C., PVA starts to be dissolved in water, and after 30 minutes, 70 to 95% or more of PVA is dissolved in water. Preferably, 95% or more of PVA is dissolved in water.

Figure 7:
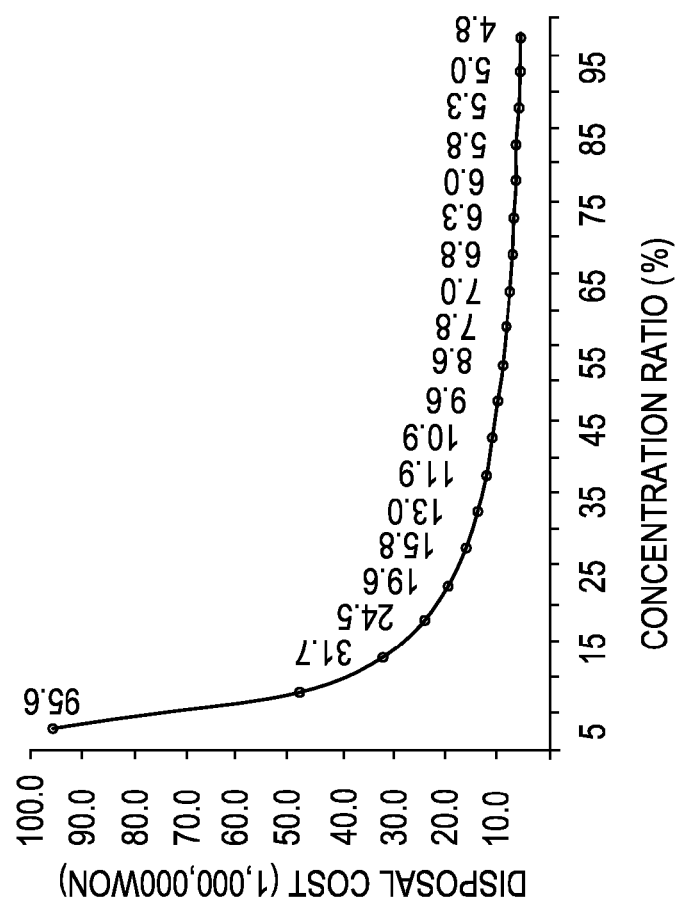
FIG. 7 is a graph showing an exemplary relationship between (i) the concentration ratio of a PVA solution treated by the present invention and (ii) the self-disposal cost.

According to one embodiment of the present invention, after the dissolution of PVA, the PVA solution can be disposed by carrying out an effective filtering process through the effective first filtering step (S4) and the second filtering step (S6), and carrying out the coagulant injecting/stirring step (S5) for forming a floc by coagulant, and the disposal step (S10) for treating the PVA solution. In the disposal step (S10), a concentrate self-disposal step (S10-1), or concentrate drying and self-disposal steps (S10-2a and S10-2b) may be selected. In consideration of the disposal cost, the optimum concentration of the PVA solution ranges from 35 to 45 w/v %. In some embodiments of the present invention, the PVA solution of 35 to 45 w/v %, produced in this step, may be incinerated through the disposal steps S10-2a and S10-2b, thereby achieving the effect of reducing the disposal cost. FIG. 7 is a graph showing the self-disposal cost of a finally decontaminated PVA solution according to the concentration ratio. The self-disposal cost shown in the graph was calculated based on that 1 ton of non-radioactive waste requires 400,000 won.

The preparation of exemplary concentrates of PVA as described above may be achieved by the specific processes/procedures described below.

A PVA solution concentrated with 35 to 45 w/v % is prepared by preparing a first solution with 5 to 15 w/v %, and carrying out a second concentration process. In order to prepare the first solution with 5 to 15 w/v %, the dissolution process is accompanied by a Fenton reaction using hydrogen peroxide and iron salt. Hydroxyl radical ions generated by the Fenton reaction can increase the dissolution rate by decomposing a high-molecular PVA material into a low-molecular material, and can minimize the clogged state of the filter in the first and second filtering steps (S4) and (S6) following the dissolving/concentrating step (S3).

In order to prepare the first PVA solution with 5 to 15 w/v %, at a point of time when 95% of the PVA materials are dissolved, hydrogen peroxide and an iron salt solution are put in, wherein the amount of 35% hydrogen peroxide appropriately ranges from 0.3 to 1.0 $L_{H2O2}/kg_{PVA protective-clothes}$, and the amount of iron salt solution appropriately ranges from 0.1 to 0.5 $L_{iron-salt-solution}/kg_{PVA protective-clothes}$.

Oxidation heat generated by the Fenton reaction can supply energy required for dissolving PVA, and thus operates as a stable energy supply source without the driving of the heater (301). The temperature of the PVA solution is maintained within a range of 98~100° C. by the heat energy generated by the Fenton reaction, thereby evaporating moisture in the PVA solution. The moisture evaporated in the dissolving step is collected in a condensate water storing tank (500) via a heat exchanger (400). Through such evaporation of moisture, moisture supplied in an excessive amount at the initial stage can be evaporated, and thus it is possible to achieve the level more close to a concentration of 35 to 45 w/v %).

According to this exemplary embodiment of the present invention, in the dissolving step, the point of time when the temperature of the multi-reactor lowers to below 95° C. is estimated as a dissolution complete stage. Once the dissolution is completed, the vacuum pump (50) is operated so as to concentrate the PVA solution and, at the same time, maintain the inside of the multi-reactor (100) at 100 to 300 Torr. When a technology for concentrating a solution under a vacuum condition is employed, it is possible to reduce the concentration time due to the superiority of moisture evaporation efficiency from waste water containing a high-concentration organic matter. The employment of the present concentration process makes it possible to achieve a reduction effect of a disposal cost as shown in FIG. 7.

All of vapor generated by the operation of the process is condensed as moisture through the heat exchanger (400) and collected in the condensate water storing tank (500), and also, the collected condensate water can be re-used in the dissolving/concentrating step (S3), thereby zeroing the generation amount of waste liquid.

Figure 2:
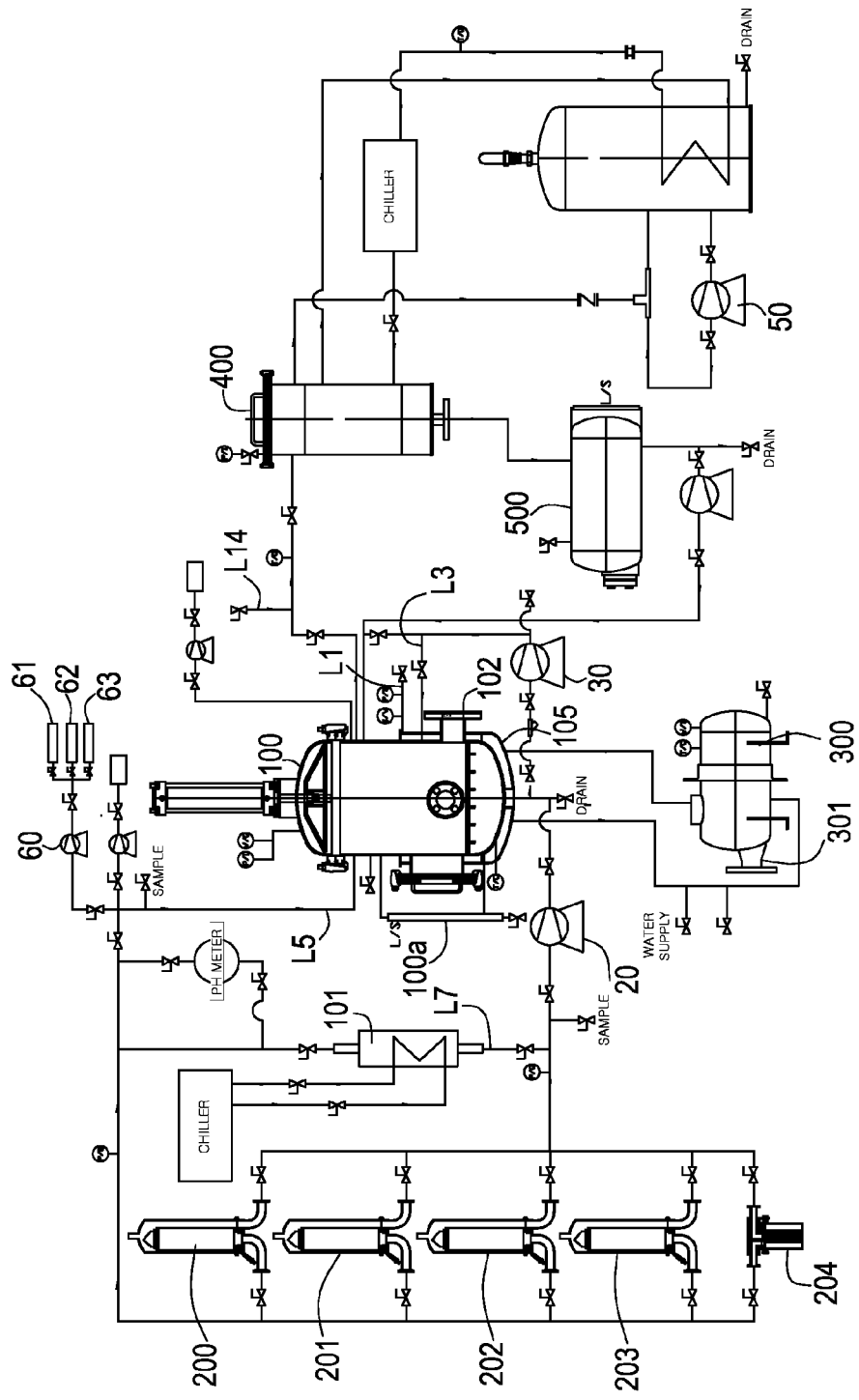
FIG. 2 is a flow chart illustrating an exemplary for decontaminating a protective product prepared from polyvinyl alcohol according to the present invention.
Figure 4:
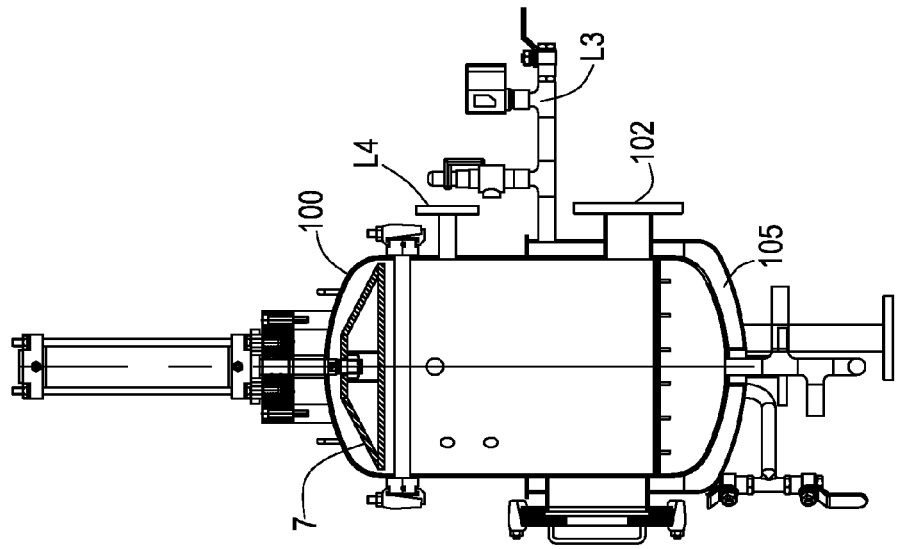
FIG. 4 is a cross-sectional view illustrating the multi-reactor shown in FIG. 3.
Figure 3:
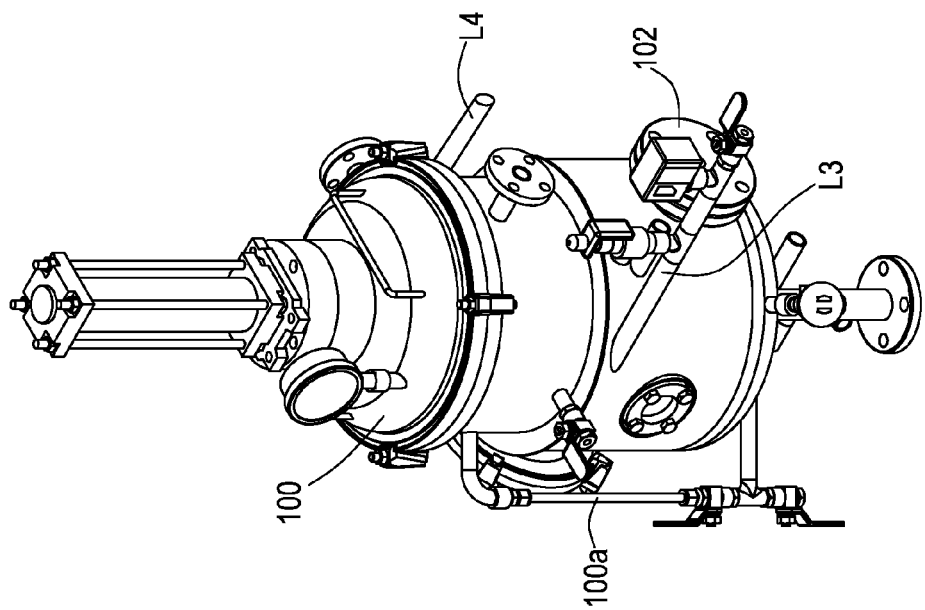
FIG. 3 is a perspective view illustrating the multi-reactor shown in FIG. 2.
Figure 6:
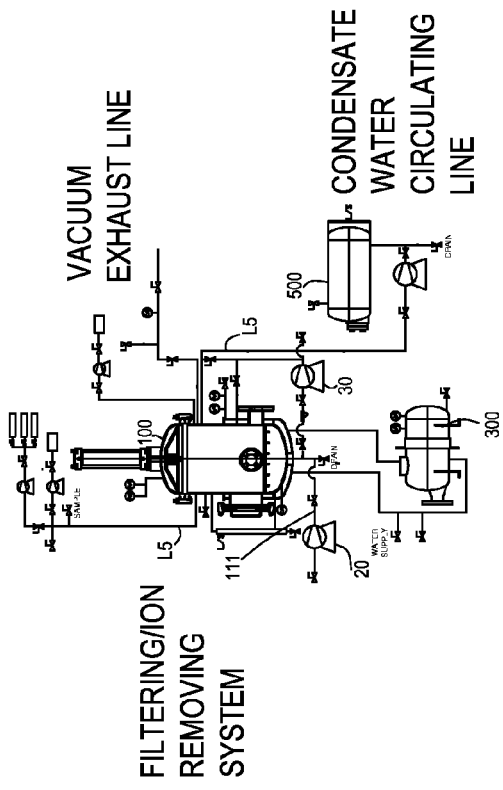
FIG. 6 is a flow chart illustrating a state where a coagulating step is separated in an exemplary method of the present invention.
Figure 5:
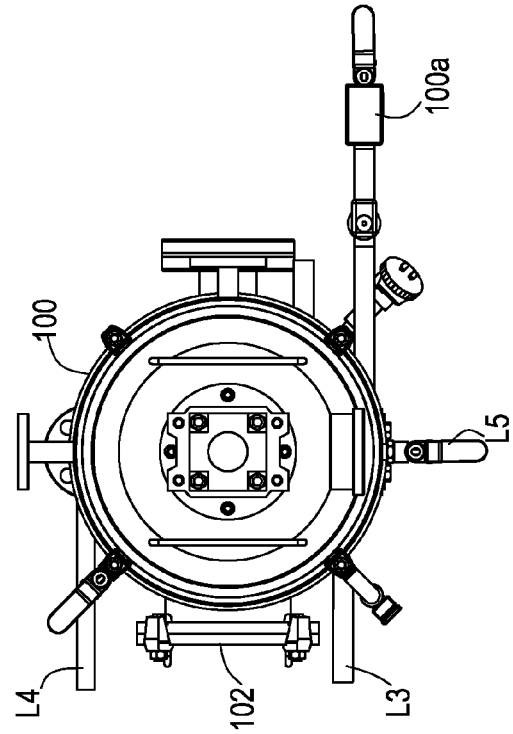
FIG. 5 is a plan view illustrating the multi-reactor shown in FIG. 3.

The PVA solution prepared by the dissolving/concentrating step (S3) may be subjected to the first filtering step (S4) in the multi-reactor, as shown in FIG. 2, or may be discharged to a coagulating bath (110) as shown in FIG. 6 in an additional filtering system.

In the first filtering step (S4) for sequentially filtering radioactive materials existing in the dissolved PVA protective product aqueous solution by using a filter, in order to remove particulates existing in the prepared PVA solution, a first filtering step is carried out by using a filtering device. The removal of the particulates existing in the PVA solution through the above described step can maximize the efficiency of removing the radioactive materials by a coagulant.

In the first filtering step, the PVA solution is sequentially passed through a filter device 200 embedded with a 80 μm filter cartridge, a filter device 201 embedded with a 20 μm filter cartridge, and a filter device 202 embedded with a 1 μm filter cartridge, by using a filter pump 20.

The kinds and the concentrations of nuclides removed through the first step are shown as results obtained by embodiments in Table 4 below. The radioactivity concentration of the dissolved/concentrated 35 w/v % PVA solution was 3.25E+01 Bq/g, and then the number of the kinds of gamma nuclides was reduced from 13 in the initial stage to 5, by 61.5% after the filtering using a filter of 80 to 1 μm. Total radioactivity concentration was reduced to 2.94E−1 Bq/g. The volume of DF finally reduced through the fist filtering step was 110.5.

7. NaOH, which is put in to adjust pH, may allow hydrogen peroxide (remaining after the Fenton reaction) to be decomposed, and dissolved heavy metal to be deposited. Thus, NaOH is effective in removing radioactive materials existing in a PVA solution, and provides a pH condition appropriate for injecting a coagulant afterwards.

In order to perform the filtering step following the completion of the dissolution, it is desired to lower the temperature of the prepared PVA solution to about 35° C. within a short time. When the PVA solution is required to be cooled, a cooling line (L7) provided with a heat exchanger (401) may be used.

In order to further decontaminate radioactive materials in the firstly filtered PVA solution, a coagulant capable of removing gamma nuclides may be injected. In injecting the coagulant, a cationic coagulant and an anionic coagulant are separately injected. In order to increase the coagulation efficiency, the pH of the PVA solution is adjusted, and the optimum range of pH is appropriately 6.5 to 7.0. In order to

TABLE 4

| | | | Dissolution/concentration and filtering/ionic nuclide removing step | | | |
|---|---|---|---|---|---|---|
| | washing step | | dissolution/ concentration | | second filtering | |
| gamma nuclide | initial stage | after washing | (35 w/v % PVA solution) | First filtering | after coagulation | ionic nuclide removing step |
| Mn-54 | 6.94E+00 | 1.51E+00 | 1.10E+00 | less than MDA | less than MDA | less than MDA |
| Fe-59 | 2.61E+00 | 6.04E−01 | 5.04E−01 | less than MDA | less than MDA | less than MDA |
| Co-60 | 2.82E+01 | 6.41E+00 | 4.11E+00 | 3.40E−02 | less than MDA | less than MDA |
| NB-94 | 1.01E+00 | 2.08E−01 | 1.78E−01 | less than MDA | less than MDA | less than MDA |
| Nb-95 | 8.71E+01 | 1.96E+01 | 1.76E+01 | 5.24E−02 | less than MDA | less than MDA |
| Zr-95 | 4.12E+01 | 9.19E+00 | 7.69E+00 | less than MDA | less than MDA | less than MDA |
| Ru-103 | 4.65E−01 | 1.12E−01 | 1.01E−01 | less than MDA | less than MDA | less than MDA |
| Ag-110m | 6.38E−01 | 1.15E−01 | 8.75E−02 | 6.07E−02 | less than MDA | less than MDA |
| Sn-113 | 7.55E−01 | 1.59E−01 | 1.09E−01 | less than MDA | less than MDA | less than MDA |
| Sb-124 | 1.30E+00 | 2.78E−01 | 1.71E−01 | 1.08E−02 | 6.58E−03 | less than MDA |
| Sb-125 | 2.25E+00 | 5.20E−01 | 3.29E−01 | less than MDA | less than MDA | less than MDA |
| Cs-137 | 2.03E+00 | 3.88E−01 | 3.45E−01 | 1.36E−01 | 6.07E−02 | less than MDA |
| Ce-144 | 7.28E−01 | 2.94E−01 | 1.98E+01 | less than MDA | less than MDA | less than MDA |
| Total activity (Bq/g) | 1.75E+02 | 3.94E+01 | 3.25E+01 | 2.94E−01 | 6.32E−03 | less than MDA |
| DF | | 4.5 | 1.2 | 111 | 46.5 | |

In the present invention, the first filtering step not only removes radioactive materials, but also allows the inside of the multi-reactor (100) to be washed. Bubbles, which may be generated in the PVA dissolving step, may contaminate the wall surfaces of the multi-reactor, and the contaminants may be operated as a contamination source of a solution. The filtrate discharged in the first filtering step is supplied into the multi-reactor (100) via a filtrate circulating line (L5). The influx angle into the multi-reactor is provided in a tangential direction of the outer circumferential surface of the multi-reactor as shown in FIG. 7, and thus a vortex is formed on wall surfaces of the multi-reactor during the incoming of the filtrate, thereby washing the inside of the multi-reactor.

In the coagulant supply step (S5) for treating untreated radioactive materials in the firstly filtered filtrate, and a second filtering step (S6), after the Fenton reaction, the PVA solution is as a strong acid with pH 2 to 3. If pH is low, radioactive metal (M; Metal) ions are in a form of M2+. Thus, it is difficult to extract the ions in water, and it is difficult to carry out effective filtering. In order to maximize the efficiency of removing radioactive materials by coagulant supplied in the following steps, it is preferable to adjust pH to be achieve the effective formation of a floc by the injection of the coagulant, a step for supplying a coagulating seed containing iron salt before the injection of a coagulant is performed.

According to exemplary embodiments of the present invention, in removing gamma nuclides in a solution containing high concentration organic matters, such as a PVA solution, an acrylamide-based polymer is effective, and also the appropriate supply amount is preferably 0.2~1.0 $mL_{polymer}/L_{PVAsolution}$, and more preferably 0.5 m $L_{polymer}/L_{PVAsolution}$. The supplied polymer can remove all gamma nuclides having (+) and (−) charges existing in the solution.

In order to efficiently operate the multi-reactor (100) of the present invention, a coagulant injecting apparatus including an iron salt solution tank (61), a cationic coagulant tank (62), an anionic coagulant tank (63), and a coagulant injecting pump (60) is preferably provided. In order to effectively inject a coagulant with high viscosity, a syringe pump (60) is preferably provided.

According to the present invention, in order to effectively mix the coagulant supplied to the multi-reactor (100), and to form a floc, the RPM of the mixing pump (30) is adjusted and the solution circulating line (L3) is used to facilitate the mixing of the PVA solution. In order to completely mix the concentrate with the coagulant, the coagulating bath (110) and an agitator (111) may be separately provided and driven, as shown in FIG. 6. Thus, through the separate operation of a dissolving/concentrating process and a coagulating/filtering process, it is possible to obtain a more stable decontaminating effect.

The results obtained by the embodiments of the present invention are shown to Table 4. As shown in Table 4, after the first filtering, the gamma nuclides showed the radioactivity of 2.94E–01 Bq/g, and then, the radioactivity was reduced to 6.23E–03 Bq/g through the second filtering after the injection of a coagulant. Herein, a very high DF value of 47.2 was achieved, and all nuclides, except for two nuclides, Sb-124 and Cs-137, were removed to less than MDA.

In the ion adsorbing step (S7) for removing untreated radioactive materials from the filtrate after the second filtering, in order to effectively remove Cs-137 and Sb-124, an ion exchange process for selectively removing the above-mentioned ions is required. In an ion exchange tower (204), nuclides of Cs-137 and Sb-124 are removed, and in the present process, a metal oxide type of ion exchange medium is preferably used.

From the collecting/separating step (S1) of PVA protective products, to the ionic nuclide removing step (S7), the radioactive materials contained in the PVA solution are subjected to various decontamination processes. The final concentrate generated in the present process is subjected to the radioactivity analyzing step (S8). Then, if the radioactivity is less than MDA, the final concentrate is transferred to the concentrate storing step (S9), while if the radioactivity is greater than MDA, the concentrate is recycled to the coagulant injecting and agitating step (S5), and is subjected to a radioactive material removing process so as to finally obtain a non-radioactive PVA concentrate. The concentrate, which has been subjected to the concentrate storing step (S9), may be treated by selectively using a self-disposal step or concentrate drying and disposal steps.

In this exemplary embodiment, the disposal step (S10) for treating the concentrated non-radioactive PVA solution comprises entrustment of a specialized incineration company outside the plant. The concentrated PVA solution, which is transferred to the concentrate storing step (S9) through the radioactivity analyzing step (S8), is classified as a non-radioactive material, and is subjected to exemplary disposal step (S10). In exemplary disposal step (S10), the self-disposal process may be divided into a concentrate self-disposal process (S10-1), which is for directly self-disposing the PVA solution concentrated to 35 w/v % according to corresponding conditions, and a dried-product self-disposal process (S10-2a and S10-2b), which is for completely removing moisture contained in the concentrate and then self-disposing the solids. Any one of the processes may be selectively used.

A specific example on the analysis of a self-disposal cost according to the concentration ratio of a PVA solution to be self-disposed is shown in FIG. 7. In a case where the PVA solution with 35 to 45 w/v %, suggested by the present invention, is self-disposed, it is expected that a disposal cost of about 13,600,000 to 10,900,000 won is required. On the other hand, in a case where the solution is completely dried up to 85 to 100 w/v %, a relatively low disposal cost of 5,600,000 to 4,800,000 won may be required.

Together with the method for decontaminating a protective product prepared from a water-soluble material according to the present invention, which comprises the above described steps, the present invention provides a decontaminating apparatus of a radioactive material, used for the decontaminating method.

Through the apparatus, a water-soluble protective product (such as a PVA protective product) generated from a nuclear power plant can be decontaminated and self-disposed, thereby maximizing the cost and the usage efficiency of the protective product.

In a case where protective products are substituted by PVA protective products, it is possible to treat the PVA protective products up to an MDA level by using the apparatus for decontaminating the PVA protective products, according to the present invention. The finally treated PVA solution can be incinerated outside the plant after being concentrated or dried, thereby "zeroing" the generated radioactive waste. Thus, there are two advantages in that the lifetime of a radioactive waste repository is prolonged and a cost for permanent disposal is reduced due to a reduction in the generation amount of waste.

The facility for decontaminating PVA protective products can be realized as a small-size movable facility, and thus can be provided in a cramped space. Thus, it is determined that such a facility is very advantageous in view of facility operation. Accordingly, the introduction of PVA protective products to domestic nuclear power plants makes it possible to expect various effects in view of in a reduction in the operating expenses of a nuclear power plant, a reduction in the amount of generated radioactive waste, and protection/sanitation of an operator.

Treatment methods for reducing radioactive waste generated from a nuclear power plant may be divided into a "within-plant treatment" method, and a "self-disposal" method. The "within-plant treatment" method is for mainly treating liquid and miscellaneous radioactive solid waste into stable materials within through solidification or oxidation and discharging/managing the treated materials within a nuclear power plant site. On the other hand, the "self-disposal" method is for removing radioactive materials existing in solid waste such as metallic waste, concrete, soil, or the like up to a level less than "a regulation range", and then recycling the removed materials outside the plant or burying them in a waste repository.

The above-described self-disposing treatment methods for disposal of PVA protective products results in a PVA solution having a relatively high PVA concentration (e.g., 35 wt % PVA). In some countries, in order to self-dispose decontaminated 35 wt % PVA solution (from the method described above) outside the plant, an approval of a government agency, such as the Institute of Nuclear Non-Proliferation and Control of The Republic of Korea is required. Also, the above-described self-disposing treatment methods typically require the liquid waste to be transferred to a temporary container and stored for several months. To address this, the present invention is further directed to a method for treating protective products manufactured by PVA, the method comprising: 1) a liquid waste pyrolysis/oxidation step for pyrolyzing and oxidizing organic matter in a filtrate treated by a dissolution-concentration tank at a high temperature; 2) a catalytic oxidation step for treating organic matter in an untreated gas discharged from pyrolysis/oxidation; 3) an exhaust cooling step for collecting and cooling waste heat in the oxidized organic matter gas; 4) a condensed water collecting step for collecting condensed water generated from the exhaust cooling step; 5) a condensed water neutralizing step for neutralizing pH of the collected condensed water in accordance with a standard of water quality of discharged water in a natural environment; and 6) a condensed water discharging step for filtering particulates in finally discharged condensed water and discharging the condensed water to a plant liquid release system (LRS).

In one exemplary embodiment, the method includes before 1) the liquid waste pyrolysis/oxidation step, steps as described above, namely, a collecting/separating step for collecting the PVA protective products from a field and separating insoluble materials; a washing step for removing the radioactive materials attached on the PVA protective products; a dissolving/concentrating step for dissolving and concentrating the washed PVA protective products; a concentrate discharging step for discharging the dissolved PVA solution from the dissolution-concentration tank to a coagulation tank; a concentrate first filtering step for firstly separating particulates in a PVA concentrate transferred to the coagulation tank by a filter; a coagulant supply/agitating step for removing radioactive materials in the first filtered PVA solution; and a second filtering step for removing a floc formed by the coagulant.

In the concentrate first filtering step, large-size particles are removed by the filter, and a pump rotating at high speed is used to sufficiently mix the organic matter with an oxidant, thereby oxidizing the PVA solution.

In the liquid waste pyrolysis/oxidation step, further, a pyrolysis/oxidation reactor is operated at 550 to 600° C. in order to oxidize the PVA solution. In the catalytic oxidation step, in order to oxidize the PVA solution, a catalytic oxidation reactor is operated at 500 to 550° C. Further, in the liquid waste pyrolysis/oxidation step, the PVA solution is sprayed in a fine particle form, and the sprayed PVA solution is heated and oxidized by regenerative media and a jacket heater. In the catalytic oxidation step, a catalyst including platinum (Pt), palladium (Pd), and alumina ($Al_2O_3$) is used.

In another aspect of the present invention, there is provided an apparatus for treating PVA protective products, the apparatus comprising: a pyrolysis/oxidation reactor for liquid waste, in which organic matter in a filtrate treated by the dissolution-concentration tank is pyrolyzed and oxidized at a high temperature; a catalytic oxidation reactor for treating organic matter in an untreated gas discharged from the pyrolysis/oxidation reactor; a heat exchanger for collecting and cooling waste heat in the oxidized organic matter gas; and a condensed water storage tank for collecting condensed water generated from the heat exchanger, wherein pH of the condensed water stored in the condensed water storage tank is neutralized in accordance with a standard of water quality of discharged water in a natural environment and particulates in finally discharged condensed water are filtered so that the condensed water is discharged to a plant LRS.

Between the pyrolysis/oxidation reactor and the dissolution-concentration tank, a coagulation tank is provided, wherein large-size particles are removed by the filter, and a pump rotating at high speed is used to sufficiently mix the organic matter with an oxidant, thereby oxidizing the PVA solution. The pyrolysis/oxidation reactor is desirably operated at 550 to 600° C. The catalytic oxidation reactor is desirably operated at 500 to 550° C.

In the pyrolysis/oxidation reactor, a PVA solution is sprayed in a fine particle form, and the sprayed PVA solution is heated and oxidized by regenerative media and a jacket heater. Air heated by a heater is supplied to the pyrolysis/oxidation reactor. The regenerative media is made of a ceramic material. In the catalytic oxidation reactor, a catalyst including platinum (Pt), palladium (Pd), and alumina ($Al_2O_3$) is desirably used to treat the PVA solution.

Figure 8:
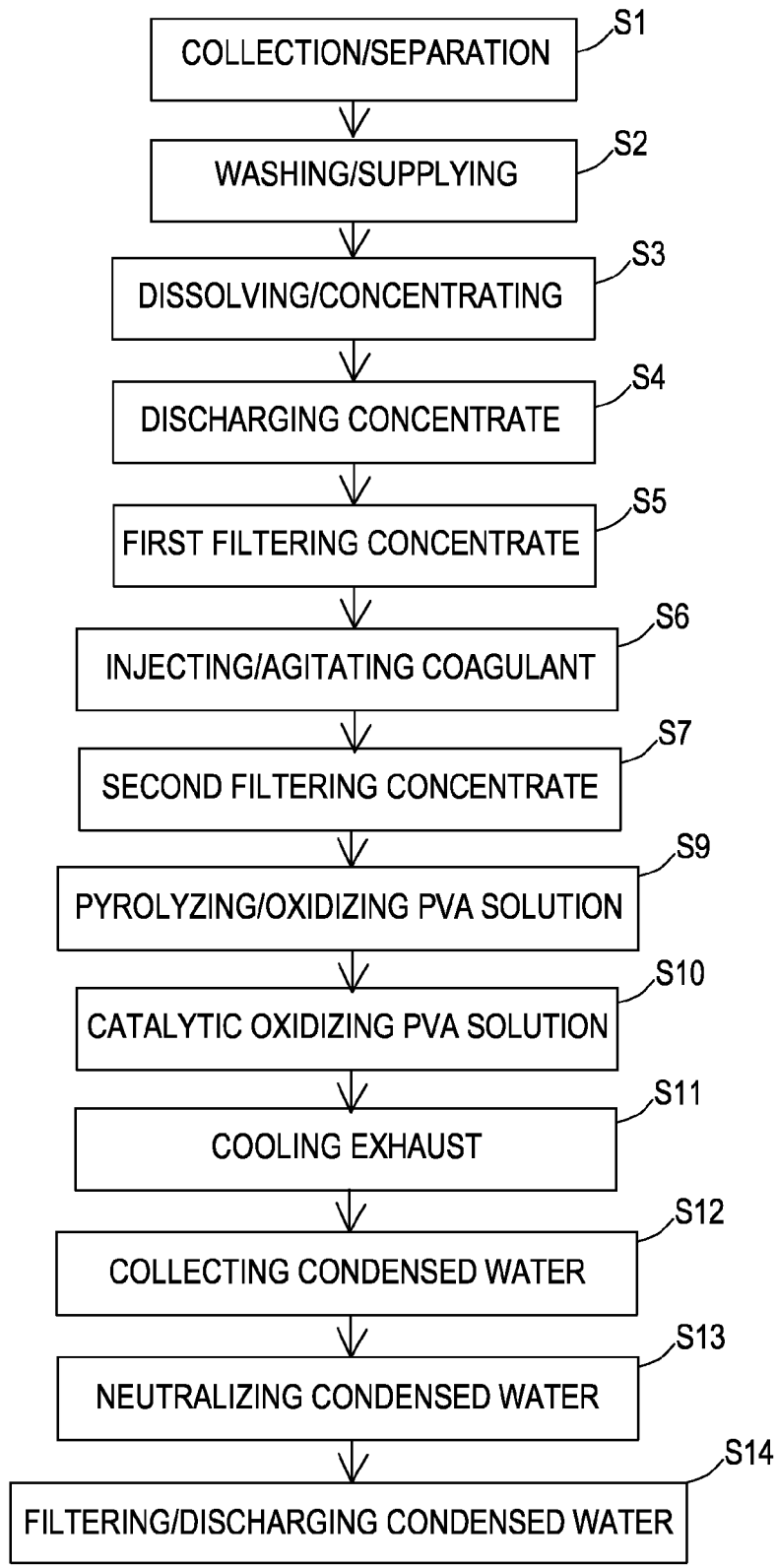
FIG. 8 is a block diagram illustrating an exemplary method for treating a protective product prepared from polyvinyl alcohol (PVA) according to the present invention.
Figure 9:
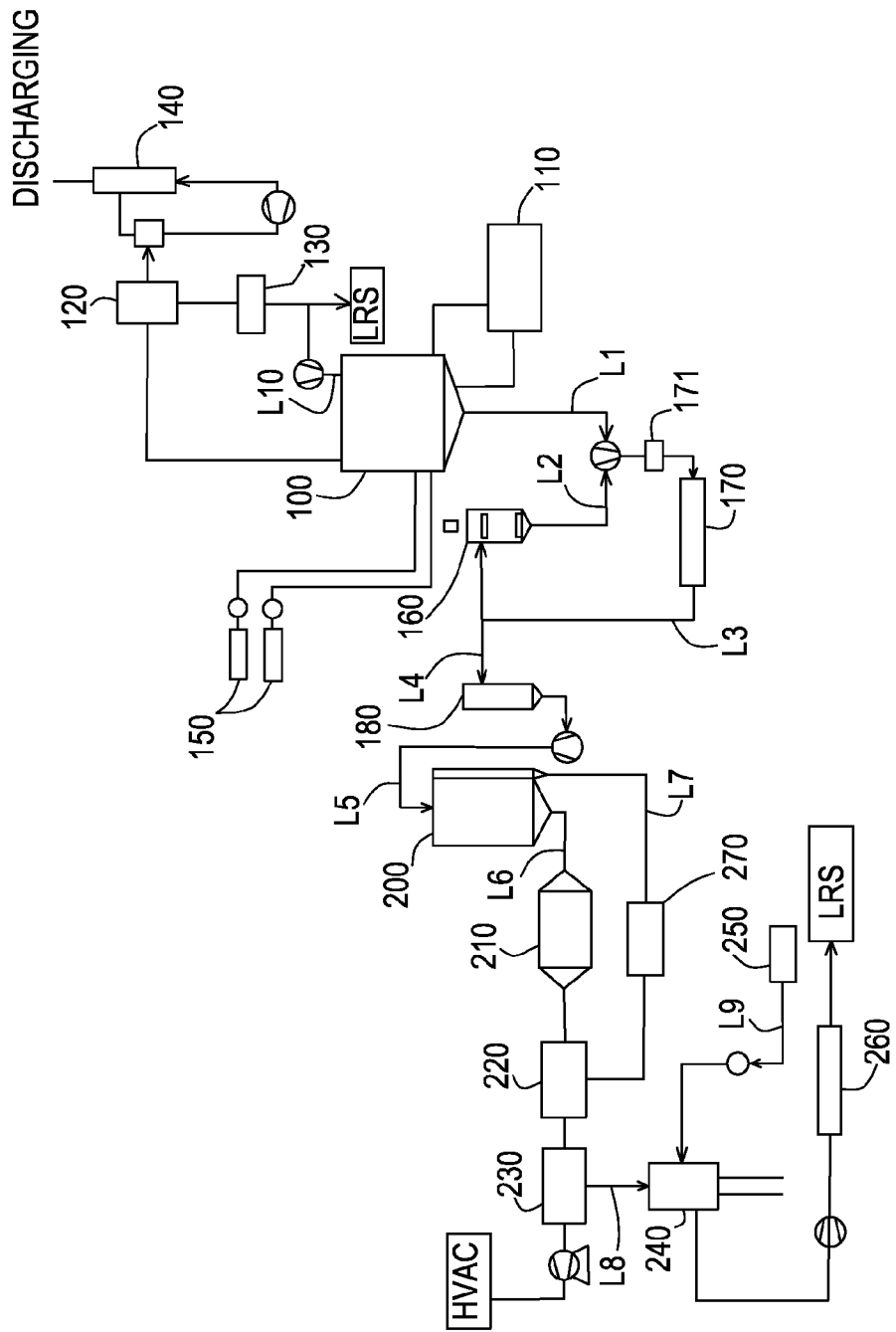
FIG. 9 is a block diagram illustrating an exemplary apparatus for treating a protective product prepared from PVA according to one embodiment of the present invention.
Figure 10:
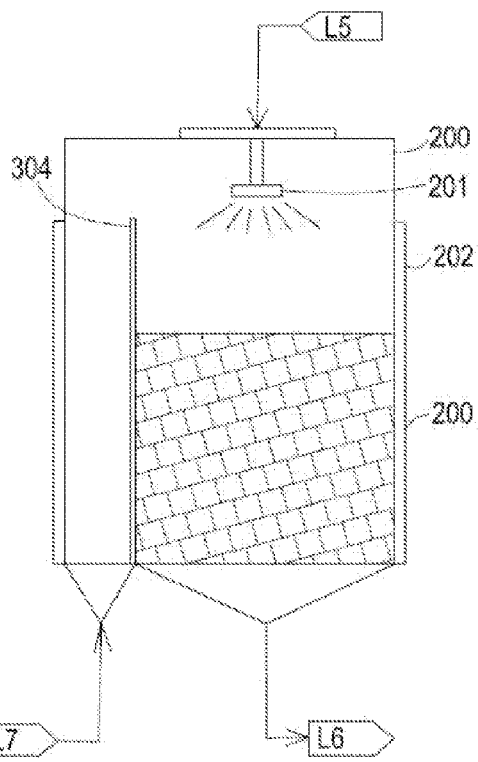
FIG. 10 is a schematic view illustrating an exemplary pyrolysis/catalytic oxidation reactor shown in FIG. 9.

Referring to FIG. 8, one exemplary process of the present invention comprises: a collecting/separating step (S1) of used protective clothes; a washing step (S2) for removing radioactive materials attached on the PVA protective products; a dissolving/concentrating step (S3) for dissolving and concentrating the washed PVA protective products so as to maximize the treatment of organic matter; a concentrate discharging step (S4) for discharging a PVA solution from a dissolution-concentration tank to a coagulation tank; a first filtering/oxidizing step (S5) for allowing particulates existing in a PVA concentrate transferred to the coagulation tank to be separated, and untreated PVA materials to be oxidized; a coagulant supply/agitating step (S6) for removing radioactive materials in the first filtered PVA solution; a second filtering step for removing a floc formed by the coagulant; a filtrate discharging step for transferring the second filtered PVA solution to a liquid waste storage tank; a pyrolysis/oxidation step (S9) for pyrolyzing/oxidizing organic matter in the PVA solution at a high temperature; a catalytic oxidation step (S10) for treating organic matter existing in an untreated gas discharged from pyrolysis/oxidation; an exhaust cooling step (S11) for collecting and cooling waste heat in gas; a condensed water collecting step for collecting condensed water generated from the previous step; a condensed water neutralizing step for neutralizing pH of the collected condensed water; and a condensed water discharging step for filtering particulates in the condensed water and discharging the filtered particulates to a power plant LRS.

The collecting/separating step (S1) is described above with reference to FIG. 1.

In the washing step (S2) for firstly removing radioactive materials attached on the PVA protective products in the exemplary process of FIG. 8, the PVA protective products contaminated by radioactive materials are washed by using a washing facility to firstly remove particulates and gamma nuclides and thereby minimizing the radioactive materials within the solution (i.e., the solution in which the PVA protective products are dissolved). Thus, it is possible to reduce filter consumption, and minimize the contamination of a pyrolysis/oxidation facility by untreated radioactive materials. As discussed above, the liquid washing generated from the washing process can be discharged linked with a nuclear power plant LRS without additional treatment, thereby reducing the burden on the treatment of generated waste liquid.

In the exemplary dissolving/concentrating step (S3) for dissolving and concentrating the washed protective products as shown in FIG. 8, the PVA protective products firstly decontaminated by the washing step (S2) are supplied in a predetermined volume through a protective product inlet at the upper portion of the dissolution-concentration tank. After the supply of the PVA protective products, the condensed water stored in a condensed water storage tank (130) is supplied to the dissolution-concentration tank (100) by a condensed water circulating pump. The condensed water storage tank (130) is mounted with a level sensor. During the operation of the condensed water circulating pump, when a level signal is equals to or greater than a predetermined level, a motor-operated valve (electric actuator) is opened, and then is closed after discharging of the condensed water into a nuclear power plant LRS by gravity. Then, the condensed water circulating pump is operated in such a manner that the condensed water can be supplied to the dissolution-concentration tank (100) until the level reaches a predetermined value by a signal of the level sensor. In other words, the dissolution-concentration tank (100) is very simply manufactured so that its contamination caused by the accumulation of the radioactive materials during dissolution/concentration of the PVA protective products can be minimized.

In the dissolution-concentration tank (100), the PVA protective products and the condensed water stored in the condensed water storage tank (130) are re-used, and herein, the condensed water is supplied in a volume of 1 L per 1 kg of protective clothes. When water is supplied to the dissolution-concentration tank (100) via a condensed water supply line (L10), a heater is operated to heat the water within a heater tank (110) up to 100 to 110° C. The heated water generates high-temperature vapor which flows in a heating jacket (not shown) at the lateral surface of the dissolution-concentration tank (100) to heat the dissolution-concentration tank (100). When the internal temperature of the heated dissolution-concentration tank 100 is 95° C., PVA starts to be dissolved in water and after 30 minutes, 95% or more of PVA is dissolved in water.

In this exemplary embodiment, the PVA protective products are dissolved without introduction of an oxidant to prepare a PVA solution 5 to 8 w/v %, and then a concentrating process is performed. When the concentrating process is started, hydrogen peroxide and an iron salt solution are introduced in an amount of 0.8 to 1 $L_{H2O2}/kg_{PVAprotective-clothes}$, and an amount of 0.4 to 0.8 $L_{iron-salt-solution}/kg_{PVAprotective-clothes}$, respectively, by a chemical supply pump (150) so that organic matter can be effectively oxidized into $CO_2$ and $H_2O$ in a condition of a high PVA concentration. The final concentrate is subjected to vaporization/concentration/oxidation processes until the PVA solution has a concentration of 35 to 40 w/v % with respect to an initial volume of the PVA protective clothes.

Meanwhile, oxidation heat generated by a Fenton reaction can supply energy for dissolving PVA and thus operates as a stable energy supply source without the heater. Heat energy generated by the Fenton reaction maintains the PVA solution in a range of 98 to 100° C. and thus evaporates the moisture in the PVA solution. The moisture evaporated in the dissolving step is collected in the condensate water storage tank (130) via a heat exchanger (120). Through such evaporation of moisture, moisture supplied in an excessive amount at the initial stage can be evaporated, and thus it is possible to achieve the level more close to the concentration (35 to 40 w/v %) required for the present invention. Hydroxyl radical ions generated by the reaction of hydrogen peroxide and iron salt in a concentrated state can effectively decompose PVA materials.

Once the dissolution is completed, a vacuum pump (not shown) connected to the heat exchanger (120) is operated so as to concentrate the PVA solution and at the same time maintain the inside of the dissolution-concentration tank (100) at 100 to 300 Torr. A technology for concentrating a solution under a vacuum condition can reduce the concentration time due to the efficient evaporation of moisture from waste water containing a high-concentration organic matter.

In the concentrate discharging step S4 shown in FIG. 8, concentrated PVA solution is discharged from the dissolution-concentration tank (100) via a concentrate discharging line (L1) by the operation of a filter pump when the internal pressure of the dissolution-concentration tank (100) reaches atmospheric pressure. The concentrated PVA solution, then is discharged to a coagulating tank (160) via a filtrate circulating line (L3). The filter pump (not shown) is operated by receiving a signal of a level sensor provided to the dissolution-concentration tank (100). The PVA solution discharged from the dissolution-concentration tank (100) to the coagulating tank (160) has the characteristics as described below.

In order to discharge the PVA solution stored in the dissolution-concentration tank (100), the filter pump is operated until the water level provided in the dissolution-concentration tank (100) reaches the lowest point. When the filter pump is operated, an automatic valve of a line (not shown) connected to a filter (170) side is automatically opened. The temperature of the solution initially discharged from the dissolution-concentration tank is in a range of 70 to 75° C., and thus may cause thermal damage to the filter (170). Accordingly, the solution is desirably cooled to below 50° C. through a water-cooled type of heat exchanger (171) and is collected in the coagulating tank (160) via the filter (170). When the water level (not shown) of the dissolution-concentration tank (100) reaches the lowest point, the operation of the filter pump is stopped. The concentrated PVA solution is collected in the coagulating tank (160) via the filter (170).

When the PVA solution is completely discharged from the dissolution-concentration tank (100) to the coagulating tank (160), steps from the collecting/separating step (S1) to the concentrate discharging step (S4) are sequentially carried out.

In the first filtering step S5 of the concentrate shown in FIG. 8, the organic matter incompletely dissolved in the dissolution of the PVA protective products can be firstly removed, which reduces the amount of organic matter to be treated in a pyrolysis/oxidation reactor (200) and a catalytic oxidation reactor (210). When the concentrate is transferred to the coagulating tank (160), the incompletely dissolved organic matter is removed by the filter (170). The filter (170) preferably has a filtering capability of 50 to 0.2 µm. The filter pump is driven at a high speed of 3600 rpm, and a turbine impeller (not shown) provided to the inside of the pump can mix the PVA solution at a high speed. Thus, hydrogen peroxide and iron salt in an unreacted state, existing within the PVA concentrate, are completely mixed, thereby causing a second Fenton reaction. Hydroxyl radical ions generated by the reaction can induce further decomposition of the PVA materials. The filter pump is preferably a Wesco-type pump capable of being operated at a high speed.

Table 5 below shows a removal ratio of organic matter in each step.

TABLE 5

| Index | Concentrate | First Filtering |
|---|---|---|
| Moisture | 90.9% | 95.4% |
| volatile solids | 8.2% | 4.2% |
| non-volatile solids | 0.9% | 0.4% |
| Total | 100.0% | 100.0% |

It can be seen from Table 5 that when a 35 wt % PVA solution is prepared by one exemplary process of the present invention, the concentration of organic matter in the concentrate is very low (8.2%). This is because 70% or more of the organic matter is oxidized into $CO_2$ and $H_2O$ by a Fenton reaction in the dissolving/concentrating step, and about 48.8% of the organic matter is further removed through the first concentrate filtering step (S5).

Coagulating step S6 shown in FIG. 8 is similar to the coagulating step describe above with reference to FIG. 1. A filtrate discharging step S8 following the coagulating step S6 and the second filtering step S7 for removing gamma nuclides are described below.

An increase in the amount of nonvolatile inorganic matter in the pyrolysis/oxidation step of the PVA solution may increase the amount of fly ash and accumulate the fly ash within the pyrolysis/oxidation reactor (200) and the catalytic oxidation reactor (210). This may cause the concentration of gamma nuclides. Accordingly, in order to radically block the concentration of the fly ash, a neutralizing step is desirably performed before the PVA solution which has been oxidized is discharged.

In other words, in an exemplary apparatus of the present invention, the PVA solution is discharged as $CO_2$ and $H_2O$ through complete oxidation. The finally generated condensed water is discharged linked with a nuclear power plant LRS. Thus, it is not necessary to completely remove the gamma nuclides existing in the PVA solution, which can further simplify the removing step of gamma nuclides.

Meanwhile, when the filtrate is finally transferred to a liquid waste storage tank (180), the filtering and discharging step of the PVA solution is completed. After the filtrate discharging step (S8) is performed 30 minutes ahead of the concentrate discharging step (S4), the process from the first concentrate filtering step (S5) to the filtrate discharging step (S8) is repeated. For example, the PVA solution is circulated among the dissolution-concentration tank (100), the filter (170), and the coagulating tank (160) via the concentrate discharging line (L1) and filtrate circulating line (L3), wherein, a filtrate transferring line (L4) is maintained in a closed state.

TABLE 6

| index | first filtering | second filtering |
|---|---|---|
| moisture | 95.4% | 95.9% |
| volatile solids | 4.2% | 3.8% |
| non-volatile solids | 0.4% | 0.28% |
| total | 100.0% | 100.0% |

The contents of elements in the PVA solution which has been subjected to the second filtering step are noted in Table 7 below.

TABLE 7

| Analysis Items | C (%) | H (%) | O (%) | N (%) | S (%) | Molecular Formula |
|---|---|---|---|---|---|---|
| PVA solution | 50.5 | 7.0 | 41.2 | N.D. | N.D. | $C_4H_7O_3$ |

In the pyrolysis/oxidation step S9 shown in FIG. 8, the PVA solution whose gamma nuclides are removed through the above-described steps is transferred to the liquid waste storage tank (180) via the filtrate transferring line (L4). Before the supply of the PVA solution into the pyrolysis/oxidation reactor (200), the internal temperature of the pyrolysis/oxidation reactor (200) is increased up to about 550° C. The air supplied into the pyrolysis/oxidation reactor (200) is supplied from the outside to a heater (270) via the a heat exchanger (220), and the supplied air is heated up to about 550 to 600° C. by using the heater (270) and allows regenerative media (203) made of a ceramic material via an air supply line (L7), filled within the pyrolysis/oxidation reactor (200), to accumulate heat. A partition wall (204) within the pyrolysis/oxidation reactor for preventing the regenerative media from blocking the air supply line is provided. In order to facilitate to increase the temperature of the regenerative media (203), a jacket heater (202) is provided at the outside of the pyrolysis/oxidation reactor (200) and the control of the jacket heater (202) is performed by a temperature sensor (not shown) provided within the pyrolysis/oxidation reactor (200).

When the pyrolysis/oxidation reactor 200 is heated up to 550° C., the PVA solution is supplied into the pyrolysis/oxidation reactor (200) via a liquid waste supply line (L5). In the pyrolysis/oxidation reactor (200), a nozzle (201) connected to the liquid waste supply line is provided, which sprays the supplied waste liquid in a fine particle form. Since the regenerative media (203) filled within the pyrolysis/oxidation reactor (200) can prolong the staying time of gas in a high temperature condition, it is possible to effectively decompose organic matter existing in the PVA solution.

Meanwhile, preferably, in the supply of the PVA solution into the pyrolysis/oxidation reactor (200), a liquid waste supply pump is operated when the water level of the liquid waste storage tank (180) is greater than the lowest point, and is automatically stopped when the level is lower than the lowest point.

In the catalytic oxidation step S10 and the exhaust cooling step S11 shown in FIG. 8, organic matter untreated in the above-described step is secondly treated in the catalytic oxidation reactor (210). A catalyst used in this step preferably includes platinum (Pt)/palladium (Pd)/alumina ($Al_2O_3$), and the catalytic oxidation reactor is preferably operated at a high temperature ranging 500 to 550° C.

Exhaust gas discharged from the catalytic oxidation reactor (210) preheats the air supplied to the pyrolysis/oxidation reactor (200) by passing through an air-cooled heat exchanger (220), and air-cools the discharged gas. The air-cooled discharged gas has a temperature ranging from about 200 to 250° C., and thus is secondly cooled up to room temperature through a water-cooled heat exchanger (230). The cooled discharged gas is divided into gas and liquid, and the condensed water is collected in a condensed water storage tank (240).

In the neutralizing step S12 and the filtering/discharging step S13 shown in FIG. 8, when the condensed water collected in the condensed water storage tank (240) reaches a predetermined level, a level sensor (not shown) provided in the condensed water storage tank senses the condensed water. After a motor-operated valve (not shown) is sequentially automatically opened, a condensed water circulating pump (not shown) is operated. After the operation of the condensed water circulating pump, when a value of a pH sensor (not shown) provided in the condensed water storing tank is lower than 6.0, the motor-operated valve (not shown) connected to a chemical tank (250) is automatically opened, and the chemical supply pump (not shown) is operated, thereby supplying a 35 wt % NaOH aqueous solution stored in the chemical tank (250). When the pH value of the condensed water is 6.0 or more for 3 seconds by the supply of NaOH, the chemical supply pump is stopped, and the motor-operated pump is stopped, thereby completing the neutralization of the condensed water.

When neutralization of the condensed water is completed, the motor-operated valve (not shown) connected to the filter (260) is automatically opened, and the motor-operated valve (not shown) positioned below the condensed water storage tank (240) is closed, thereby discharging the condensed water via the filter (260) to the power plant LRS. The provided filter (260) is preferably mounted with a 3 μm filter. The discharge of the condensed water is carried out only until a level of the level sensor (not shown) provided between the condensed water storing tank (240) and the filter (260) reaches a lowest point. When the level reaches the lowest point, the operation of the condensed water circulating pump is stopped, and the motor-operated valve provided between the condensed water storing tank and the filter and the motor-operated valve provided below the condensed water storing tank are sequentially closed, thereby completing the filtering/discharging step (S14) of condensed water. For example, the temperature of the gas discharged by the catalytic oxidation reactor (210) is cooled to room temperature through air-cooled and water-cooled steps.

Moisture existing in the discharged gas having a room temperature is collected in the condensed water storage tank (240) and pH of the moisture is adjusted to a range of 6.0 to 6.5 in accordance with a standard of water quality in a natural environment. Then, fly ash, which may exist in the condensed water, is removed by the filter and is discharged to the nuclear power plant LRS.

Figure 11:
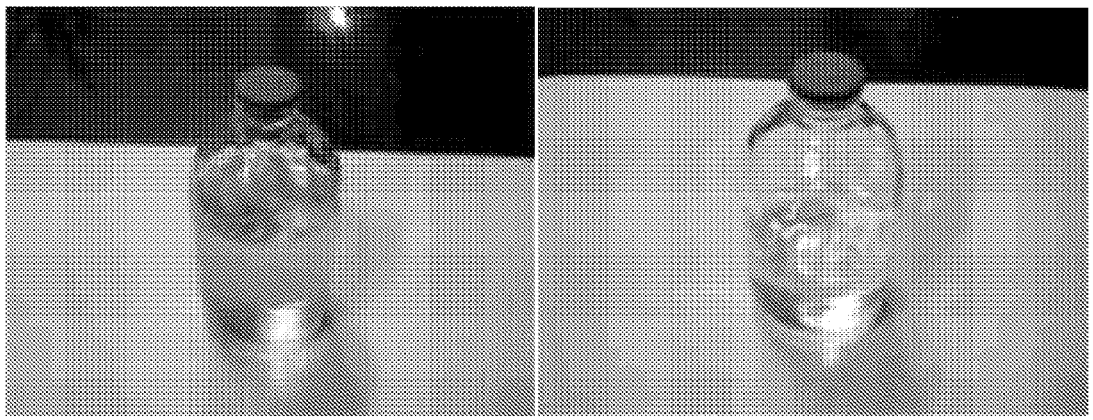
FIG. 11 shows photographs of an exemplary PVA solution treated by the disclosed methods and apparatus of the present invention.

As shown in FIG. 11, an exemplary sample (at the left of FIG. 11) is obtained in the filtrate discharging step (S8), and a sample (at the right of FIG. 11) is obtained in the condensed water filtering/discharging step (S14). As shown in FIG. 11, in the PVA protective products treated according to the present invention, a COD concentration of final discharged water may be adjusted to 15 ppm.

In this exemplary embodiment of the present invention, the condensed water neutralizing step (S13) and the condensed water filtering/discharging step (S14) are automatically operated and controlled by the water level sensor (not shown) provided in the condensed water storage tank (240), thereby improving the convenience of facility operation. The process from the condensed water collecting step (S12) to the condensed water filtering/discharging step (S14) is automatically repeated by the water level sensor (not shown) of the condensed water storage tank (240).

Together with the method for treating protective products made of a water-soluble material, including the steps as described above, the present invention provides an apparatus for treating radioactive materials, used for the treatment method.

Through the apparatus, a water-soluble protective product (such as a PVA protective product) generated from a nuclear power plant can be treated within the plant, thereby maximizing the cost efficiency for permanent disposal of combustible waste and the usage efficiency of the protective product.

The present invention enables the facility for self-disposing disposable protective products prepared from conventional polyvinyl alcohol (PVA) through pyrolysis/catalytic oxidation of a PVA solution generated by dissolution and concentration, as well as treating the decontaminated PVA solution within a plant, to be relatively small. Thus, there is an economical advantage such as a reduction in power consumption, unlike a large-scale facility. The facility can be realized as a small-size movable facility and thus can be provided in a cramped space.

Furthermore, as described above in exemplary embodiments of the present invention, the use of catalysis and a heat medium is very advantageous in view of the operation of the facility. Thus, the introduction of PVA protective products to domestic nuclear power plants makes it possible to expect various effects in view of in a reduction in the operating expenses of a nuclear power plant, a reduction in the generation amount of radioactive waste, and protection/sanitation of an operator.

The present invention is not limited to the above described embodiments, and those skilled in the art will understand that various modifications, additions and substitutions are possible without departing from the scope and spirit of the invention as disclosed in the accompanying claims.

What is claimed is:

1. A method for treating protective products manufactured by polyvinyl alcohol (PVA) so as to treat radioactive materials attached on the PVA protective products by a dissolution-concentration tank, the method comprising:

a liquid waste pyrolysis/oxidation step for pyrolyzing and oxidizing organic matter in a filtrate treated by the dissolution-concentration tank at a high temperature;

a catalytic oxidation step for treating organic matter existing in an untreated gas discharged from the pyrolysis/oxidation step;

an exhaust cooling step for collecting and cooling waste heat in the oxidized organic matter gas;

a condensed water collecting step for collecting condensed water generated from the exhaust cooling step; and a condensed water discharging step for filtering particulates in finally discharged condensed water and discharging the condensed water to a plant liquid release system (LRS).

2. The method of claim 1, wherein the method further comprises, before the liquid waste pyrolysis/oxidation step:

a dissolving/concentrating step for dissolving and concentrating the PVA protective products;

a concentrate first filtering step for separating particulates existing in the PVA concentrate by a filter; and a second filtering step.

3. The method of claim 2, wherein in the concentrate first filtering step, large-size particles are removed by the filter and a pump rotating at high speed is used to sufficiently mix the organic matter with an oxidant, thereby oxidizing the PVA solution.

4. The method of claim 1, wherein in the liquid waste pyrolysis/oxidation step, a pyrolysis/oxidation reactor is operated at a temperature in order to oxidize the PVA solution.

5. The method of claim 1, wherein in the catalytic oxidation step, a catalytic oxidation reactor is operated at a temperature in order to oxidize the PVA solution.

6. The method of claim 1, wherein in the catalytic oxidation step, a catalyst comprising platinum (Pt), palladium (Pd), and alumina ($Al_2O_3$) is used.

7. An apparatus for treating PVA protective products according to the method of claim 1, the apparatus comprising:

a pyrolysis/oxidation reactor for liquid waste, in which organic matter in a filtrate treated by the dissolution-concentration tank is pyrolyzed and oxidized at a high temperature;

a catalytic oxidation reactor for treating organic matter existing in an untreated gas among gas treated in the pyrolysis/oxidation reactor;

a heat exchanger for collecting and cooling waste heat in the oxidized organic matter gas; and a condensed water storage tank for collecting condensed water generated from the heat exchanger.

8. The method of claim 1, further comprising:

a radioactivity concentration analyzing step of a PVA solution whose radioactive materials are removed, and a concentrate storing step; and a disposal step for treating a concentrated non-radioactive PVA solution.

9. The method of claim 2, wherein a multi-reactor is connected to a heater tank for heating an inside of the multi-reactor in the PVA dissolving/concentrating step.

10. The method of claim 9, wherein the heater tank heats the multi-reactor while PVA of the protective products is firstly dissolved in a solution within the multi-reactor.

11. The method of claim 10, wherein the solution comprising PVA dissolved therein is concentrated so as to minimize a generation amount of liquid-state waste to be self-disposed.

12. The method of claim 9, wherein the heater tank allows purified water whose ionic particles are removed to indirectly heat the multi-reactor via a heating jacket.

13. The method of claim 12, wherein the purified water contained in the heater tank is formed into vapor of 100-130° C. by a heater.

14. The method of claim 9, wherein in the multi-reactor, during first dissolution of PVA, hydrogen peroxide and iron salt are introduced for causing a Fenton reaction, and hydroxyl radicals generated from the Fenton reaction facilitate dissolution of PVA.

15. The method of claim 9, wherein in the multi-reactor, during first dissolution of PVA, when 70 to 95% of PVA material is dissolved, hydrogen peroxide and an iron salt solution are introduced to cause a Fenton reaction.

16. The method of claim 14, wherein the hydrogen peroxide is introduced in an amount of 0.3 to 1 $L_{H2O2}/kg_{PVA protective-clothes}$, and the iron salt solution is introduced in an amount of 0.1 to 0.5 $L_{iron-salt-solution}/kg_{PVA protective-clothes}$.

17. The method of claim 14, wherein the iron salt solution is formed by introducing 6.25 mL of $H_2SO_4$ and 2.18 g of $FeSO_4 7H_2O$ in a 500 mL volumetric flask, and filling distilled water up to 500 mL of the volumetric flask, followed by a purifying process for one hour.

18. The method of claim 2, wherein in the first filtering step, a filter with a diameter of 1 to 80 μm is used to firstly remove radioactive nuclides contained in the concentrate.

19. The method claim 2, wherein in the first filtering step and the second filtering step, a filter with a diameter of 0.2 to 80 μm is used to filter the concentrate.

20. The method of claim 8, wherein the disposal step for treating the PVA solution is carried out by any one of a concentrate self-disposal process or a concentrate dried-product incineration disposal process.

* * * * *